(12) United States Patent
Jensch

(10) Patent No.: US 11,821,496 B2
(45) Date of Patent: Nov. 21, 2023

(54) LINEAR ACTUATOR

(71) Applicant: LINAK A/S, Nordborg (DK)

(72) Inventor: Rupert Jensch, Flensburg (DE)

(73) Assignee: Linak A/S, Nordborg (DK)

( * ) Notice: Subject to any disclaimer, the term of this patent is extended or adjusted under 35 U.S.C. 154(b) by 157 days.

(21) Appl. No.: 16/762,075

(22) PCT Filed: Nov. 12, 2018

(86) PCT No.: PCT/DK2018/000169
§ 371 (c)(1),
(2) Date: May 6, 2020

(87) PCT Pub. No.: WO2019/091523
PCT Pub. Date: May 16, 2019

(65) Prior Publication Data
US 2020/0340557 A1 Oct. 29, 2020

(30) Foreign Application Priority Data
Nov. 12, 2017 (DK) .......................... PA 2017 00640

(51) Int. Cl.
*F16H 25/20* (2006.01)
*F16D 3/04* (2006.01)
(Continued)

(52) U.S. Cl.
CPC ............... *F16H 25/20* (2013.01); *F16D 3/04* (2013.01); *H02K 7/06* (2013.01); *H02K 7/116* (2013.01);
(Continued)

(58) Field of Classification Search
CPC ................ F16H 25/20; F16H 25/2418; F16H 2025/2031; F16H 2025/2075;
(Continued)

(56) References Cited

U.S. PATENT DOCUMENTS

2007/0261506 A1  11/2007 Ymker
2014/0224045 A1* 8/2014 Kummer ................. F16H 19/02
                                                                74/60
(Continued)

FOREIGN PATENT DOCUMENTS

DE    202017102066 U1 *  8/2018  ............. F16H 25/20
DE    102014015388 B4 * 10/2018  ......... E05B 47/0012
(Continued)

OTHER PUBLICATIONS

International Search Report, PCT/DK2018/000169, dated Jan. 25, 2019.

*Primary Examiner* — Zakaria Elahmadi
(74) *Attorney, Agent, or Firm* — Dykema Gossett PLLC (57) ABSTRACT

A linear actuator (1) comprising an electric motor (20), a transmission (40), a spindle (80) being connected to the transmission (40), a spindle nut (81) being arranged on the spindle (80), a housing (10), an outer tube (3) being connected to the housing (10), and an inner tube (2) being connected to the spindle nut (81). The spindle nut (81) and the inner tube (2) are guided inside the outer tube (3). The transmission (40) including a transmission housing (41), a transmission input end and a transmission output end positioned opposite the transmission input end. A coupling (30) including a first coupling part (32) being connected to the output end of the transmission, a second coupling part (34) being connected to the end of the spindle and a coupling member (36) disposed between the first and second coupling parts (32, 34) and slidably engaged with the first and second coupling parts (32, 34).

8 Claims, 8 Drawing Sheets

(51) Int. Cl.
*H02K 7/06* (2006.01)
*H02K 7/116* (2006.01)
*F16H 25/24* (2006.01)

(52) U.S. Cl.
CPC .. *F16H 25/2418* (2013.01); *F16H 2025/2031* (2013.01); *F16H 2025/2075* (2013.01); *F16H 2025/2087* (2013.01)

(58) Field of Classification Search
CPC ..... F16H 2025/2087; F16D 3/04; H02K 7/06; H02K 7/116
See application file for complete search history.

(56) References Cited

U.S. PATENT DOCUMENTS

2014/0230586 A1   8/2014   Saxstetter
2017/0219086 A1   8/2017   Brownell
2018/0216390 A1 * 8/2018   Takizawa .................. F16H 1/32
2020/0165856 A1 * 5/2020   Scheuring ................. F16H 1/46
2020/0291710 A1 * 9/2020   Kummer .................. F16H 25/20

FOREIGN PATENT DOCUMENTS

| DE | 102019114170 A1 | * | 12/2019 | ............ E05B 79/20 |
| EP | 2543808 A1 | | 1/2013 | |
| EP | 3211271 A2 | * | 2/2017 | ............ F16H 35/10 |
| EP | 3330467 A1 | * | 6/2018 | ............ E05F 15/689 |
| EP | 3330571 A1 | * | 6/2018 | ......... F16H 25/2056 |
| JP | 2010263670 A | | 11/2010 | |
| JP | 2013230075 A | * | 11/2013 | ............ H02K 5/145 |
| JP | 2017172201 A | * | 9/2017 | ............ E05F 15/622 |
| KR | 101394183 B1 | | 5/2014 | |
| WO | WO-2016082911 A1 | * | 6/2016 | ............ H02K 7/003 |
| WO | 2017022503 A1 | | 2/2017 | |
| WO | WO-2019105808 A1 | * | 6/2019 | ........... B62D 33/027 |

* cited by examiner

LINEAR ACTUATOR

CROSS-REFERENCE TO RELATED APPLICATIONS

This application is a national stage filing based upon international application no. PCT/DK2018/000169, filed 12 Nov. 2018 (the '169 application), and published in English on 16 May 2019 under international publication no. WO 2019/091523 A1, which claims priority to Denmark (DK) patent application no. PA 2017 00640, filed 12 Nov. 2017 (the '640 application). The '169 application and the '640 application are both hereby incorporated by reference as though fully set forth herein.

TECHNICAL FIELD

The invention relates to a linear actuator comprising an electric motor, a transmission, a spindle, a spindle nut, a housing, an outer tube and an inner tube, the outer tube being connected to the housing, the spindle being interconnected to the transmission, the spindle nut being arranged on the spindle, the inner tube being connected to the spindle nut, the spindle nut and the inner tube being guided inside the outer tube.

BACKGROUND

Linear actuators are widely used for various applications in a number of industries and sectors including the hospital and care sectors.

The general object of the present invention is to reduce the built-in dimension of a linear actuator.

A further object of the present invention is to provide a thermal and an electrical insulation between the motor and the spindle for preventing heat and current from being transferred to the outer tube and inner tube of the linear actuator.

A further object of the present invention is to provide a linear actuator with a motor, a transmission and spindle being coaxially arranged.

A further object of the present invention is to provide compensation for the misalignment between the output end of the transmission and the spindle in a linear actuator.

A further object of the present invention is to provide a linear actuator, which is configured to be retrofitted at various locations on equipment for use in the hospital and care sectors.

The above objects will be evident from the below detailed description. According to an embodiment of the present invention, this is achieved by a linear actuator comprising:
- a transmission including a transmission housing, a transmission input end and a transmission output end positioned opposite the transmission input end;
- an electric motor having an output shaft being coaxially connected to the transmission input end of the transmission;
- a coupling including a first coupling part being connected to the output end of the transmission, a second coupling part being connected to one end of the spindle and an intermediate coupling member disposed between the first and the second coupling parts and slidably engaged with the first and the second coupling parts.

By using a coupling comprising three main components, it is possible to compensate for radial misalignments between the transmission and the spindle. The main component of the coupling being; a first coupling part being connected to the output end of the transmission, a second coupling part being connected to the end of the spindle and an intermediate coupling member disposed between the first and the second coupling parts and slidably engaged with the first and the second coupling parts.

More specifically, the coupling is also used for compensating for misalignments between the output end of the transmission and the first end of the spindle. During the assembling of the linear actuator, the first end of the spindle can be slightly misaligned relative to the output end of the transmission, however, by using a coupling according to the present invention, it is possible to compensate for this misalignment.

By using a coupling of the above type, torque is transmitted between the first coupling part and the intermediate coupling member and between the intermediate coupling member and the second coupling part, preferably by means of two orthogonal components.

One advantage of the present coupling is that the coupling ensures ideal compensation while at the same time being torsionally rigid and with a high torque-to-weight ratio.

The intermediate coupling member is used for transmitting torque and has a rigid and wear-resistant surface in the sliding connection area.

By using a coupling being connected directly to the transmission and by connecting the motor directly to the opposite end of the transmission, it is possible to reduce the build-in dimension. The motor is carried by the transmission housing and the motor is suspended from the transmission; therefore, no suspension element is needed around the motor itself.

By using a planet carrier, where the first coupling part is formed as an integrated part of the planet carrier, it is possible to reduce the build-in dimension of the linear actuator, and the planet carrier constitutes both the first coupling part of the coupling, the output end of the transmission and is used as a journal bearing.

By using a coupling member having a number of recesses, which do not extend through the entire thickness of the coupling member, it is possible to use the coupling member to provide a thermal and an electrical insolation between the electrical motor and the spindle for preventing heat and current from being transferred to the outer tube and inner tube of the linear actuator.

The coupling would be of the type belonging to: bellow type coupling, cross joint coupling, disk type coupling, friction coupling or jaw type coupling etc.

In this context, the term planetary gear set also refers to an epicyclical gear set. The planetary gear set comprises a sun gear in the centre, planet gears, which rotate around the sun gear, a planet carrier that connects the planet gears, and a ring gear on the outside that meshes with the planet gears. More specifically, noise is primarily generated as the planet gear meshes with the sun gear and when the linear actuator is under load.

Preferably, the transmission comprises a three-stage planetary gear having three planetary gear set, but could also be a two-stage planetary gear having two planetary gear sets or a one stage planetary gear having one planetary gear set.

It should in this context be evident, that the engaging elements could consist of several elements surrounding the transmission housing instead of just one single element.

DETAILED DESCRIPTION

The invention will now be explained in further detail below by exemplary embodiments and with reference to the schematic drawing.

Figure 1A:
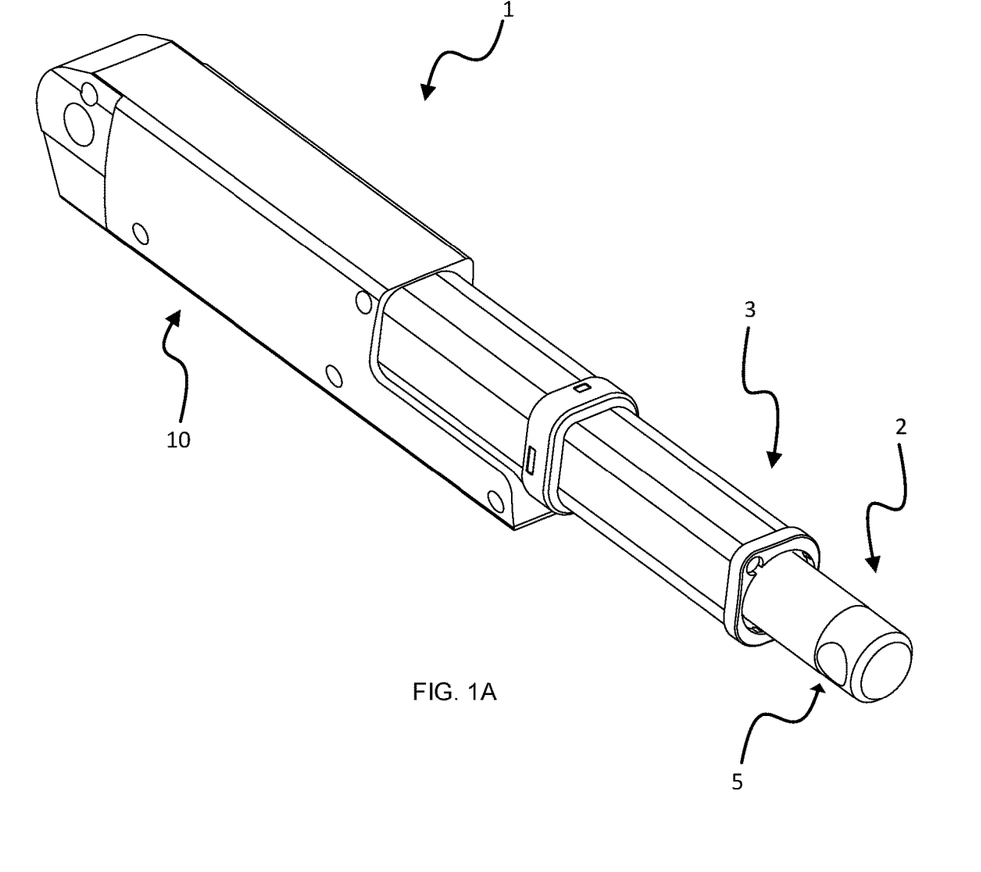
FIG. 1A-1B show a linear actuator.
Figure 1B:
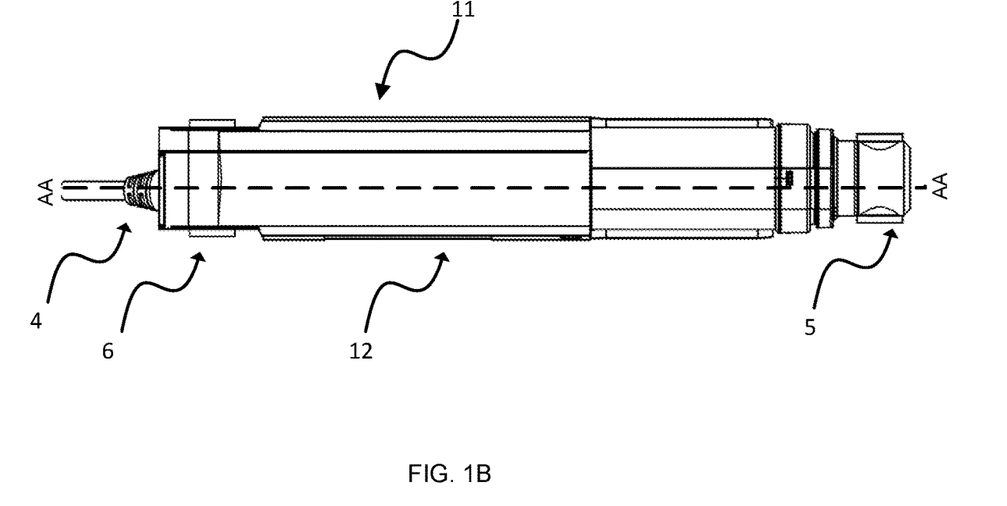

FIGS. 1A and 1B show a linear actuator 1 comprising an outer tube 3 and an inner tube 2. The housing 10 consists of a first housing part 11 and a second housing part 12. The housing is provided with a gasket (not shown) for preventing water or dust from entering the interior space of the linear actuator 1.

The linear actuator of the present invention is used in furniture (e.g. hospital beds or domestic beds) or a wheel chair. For mounting the linear actuator, the rear end of the housing is equipped with a rear mounting 6, and the outer tube is connected to a front mounting 5. The rear mounting 6 and front mounting 5 are pivotally connected to two individual elements on the piece of furniture or wheel chair.

The linear actuator 1 comprises an electric motor 20, typically a reversible electric motor, which can be either a DC or an AC motor for low voltage or mains voltage. The linear actuator 1 comprises a socket 4 for connecting the linear actuator 1 to a power supply or an electric controller (not shown in the figures).

Figure 2:
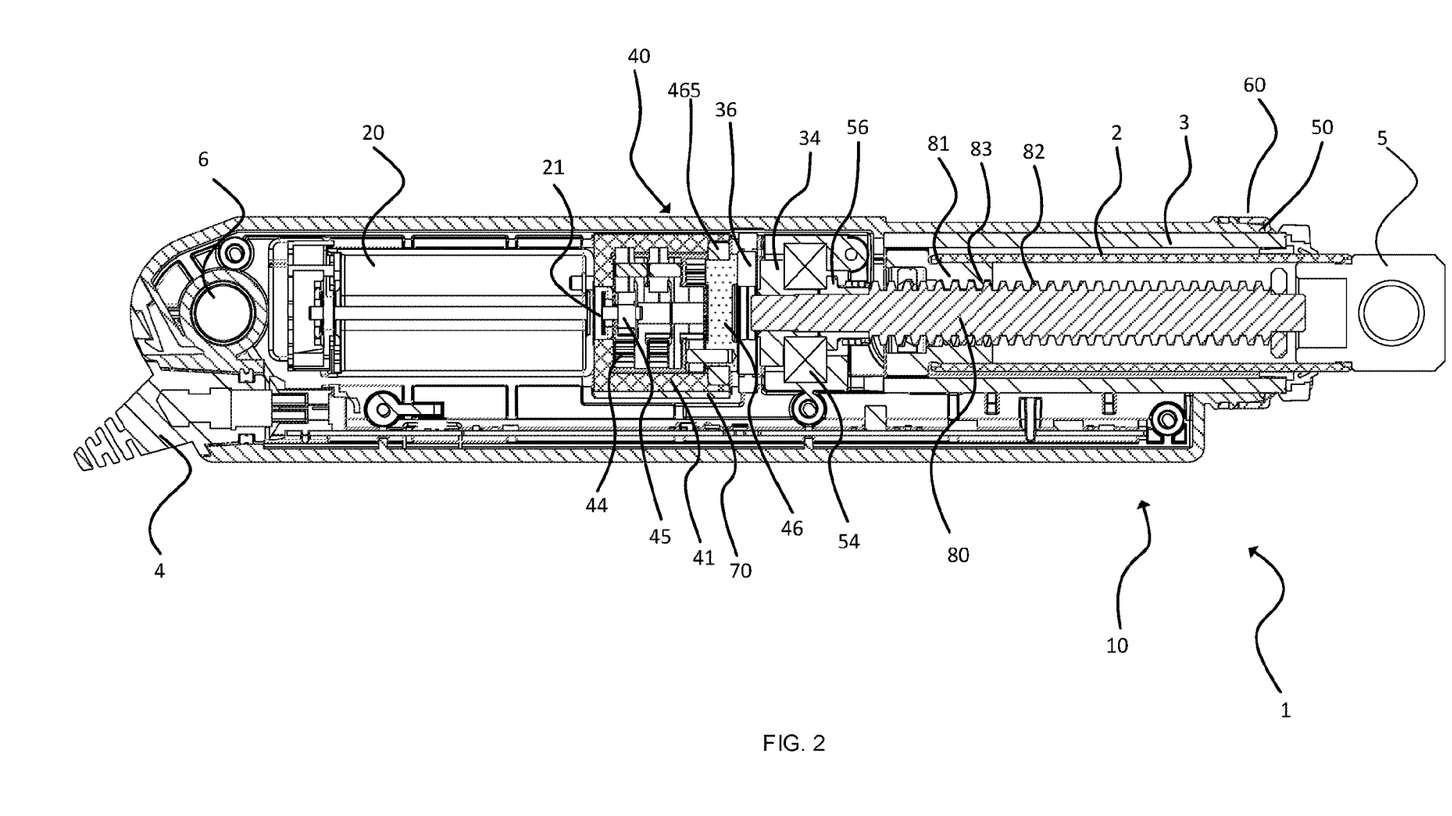
FIG. 2 shows a cross-sectional view AA of the linear actuator according to a preferred embodiment of the present invention.
Figure 3:
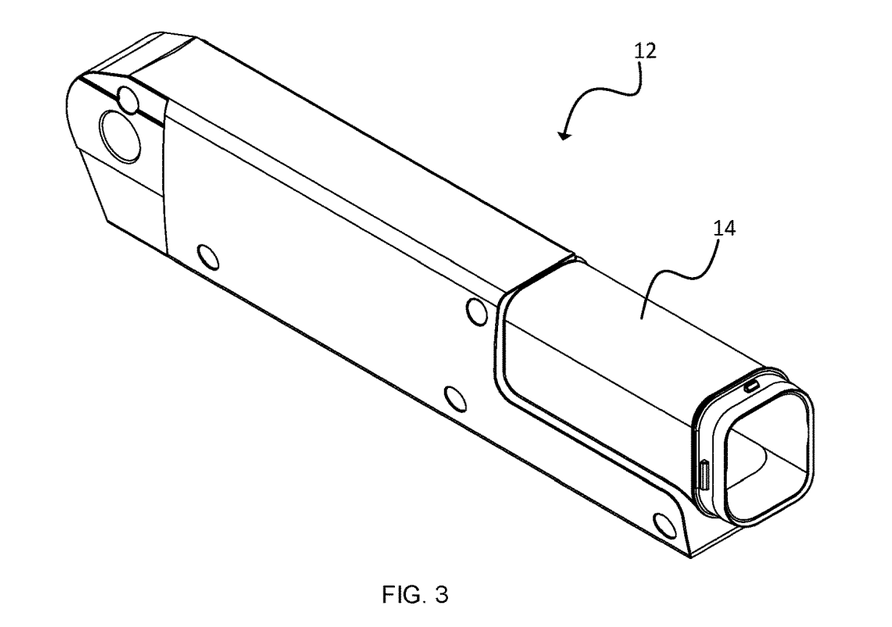
FIG. 3 shows a first perspective view of the housing according to a preferred embodiment of the present invention.
Figure 4:
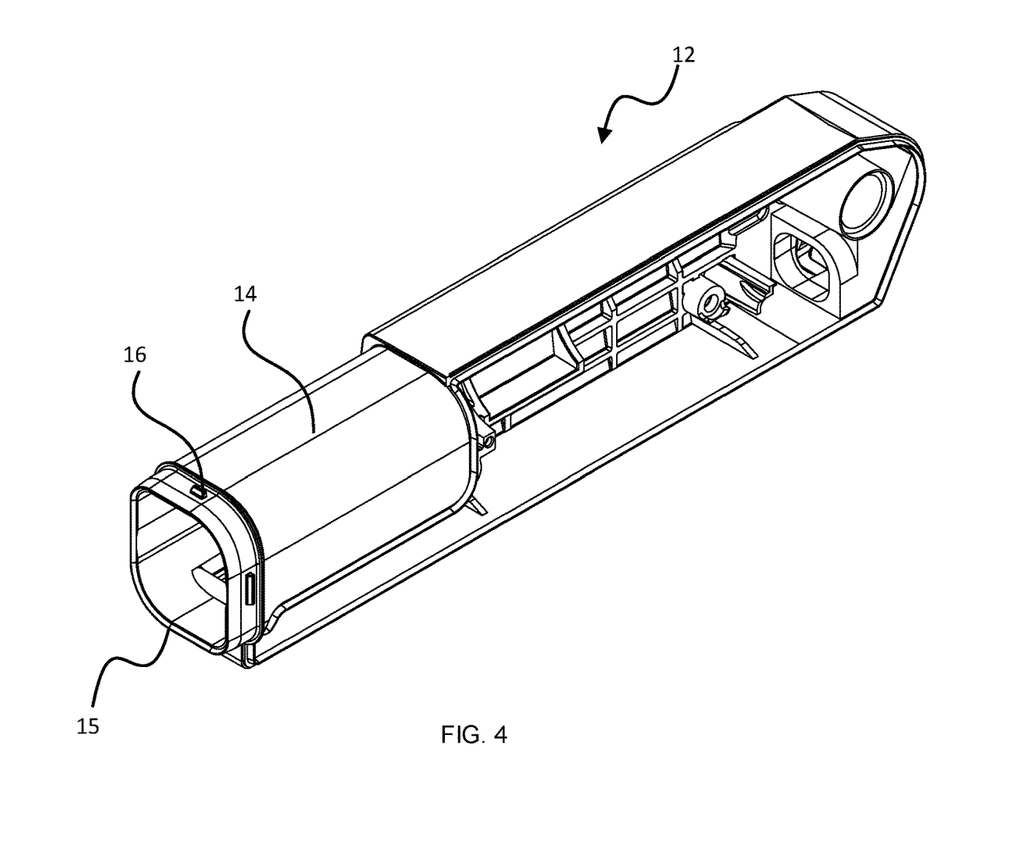
FIG. 4 shows a second perspective view of the housing for the linear actuator according to the present invention.

In FIG. 2, the electric motor 20 is connected to a transmission 40, and the coupling interconnects the transmission and the spindle 80. The spindle 80 has a spindle end 84 connected to the transmission 40 via an Oldham coupling 30 for accommodating a parallel misalignment between the spindle 80 and the transmission 40.

The linear actuator 1 further comprises a spindle 80 driven by the electric motor 20 through a transmission 40, preferably a planetary gear. The spindle 80 is connected to the transmission via a coupling 30 such as an Oldham coupling which can accommodate for parallel misalignment. The electric motor 20, the transmission 40 and the outer tube 3 are coaxially arranged.

FIG. 2 shows an outer tube 3 connected to the housing 10, and the inner tube 2 is connected to the spindle nut. The spindle nut and the inner tube 2 are guided inside the outer tube 3.

FIG. 2 shows a cross-sectional view of the linear actuator 1 comprising a spindle 80, a spindle nut 81, a housing 10, an outer tube 3 and an inner tube 2. The spindle nut 81 is arranged on the spindle 80 which is connected to the transmission 40. The outer tube 3 is connected to the housing 10 and the inner tube 2 is connected to the spindle nut 81. The spindle nut 81 is secured against rotation and guided inside the inner tube 2. The inner tube 2 is guided inside the outer tube 3.

The spindle nut 81 has internal threads 82 for engaging the external threads 83 of the spindle 80, and the spindle nut 81 is arranged on the spindle 80. The spindle nut 81 is guided inside the inner tube 2 and is secured against rotation.

The end part of the spindle nut 81 is adapted for receiving the front mounting 5. More specifically, the front mounting 5 is fastened to the spindle nut 81 via corresponding threads on both parts, or the spindle nut 81 can have a projecting edge or shoulder on which the front mounting 5 can be accommodated.

Activation of the electric motor 20 will, via the transmission 40, cause the spindle 80 to rotate, whereby the spindle nut 81 and front mounting 5 will travel along the longitudinal axis of the spindle 80 in a direction depending on the rotation angle of the electric motor 20. The sealing element 50 is arranged between the outer tube 3, the housing 10 and the retaining element 60.

FIG. 3-6 show the second housing part 12 of the housing having a tubular section 14 with an opening for receiving the outer tube 3, and the opening of the tubular section 14 has an inclined inner surface. The inclined inner surface constitutes the contact surface as the inclined inner surface is engaging the sealing element 50, when the linear actuator is assembled.

The second housing part 12 of the housing is provided with a number of connecting elements 16 complementing the recesses in the retaining element. The outer tube 3 has a circular or a polygonal geometry comprising four side walls forming a rectangular shape preferably with rounded corners.

The retaining element 60 is connected to the housing 10, the retaining element being configured for retaining the sealing element 50 relative to the housing 10. The housing 10 has an end part 15 having an inclined inner surface 13 facing the outer tube 3 for partial accommodation of the sealing element 50. The retaining element is made from a polymeric material such as nylon material and slides onto the outer tube. The retaining element could be formed as a bushing.

Figure 5:
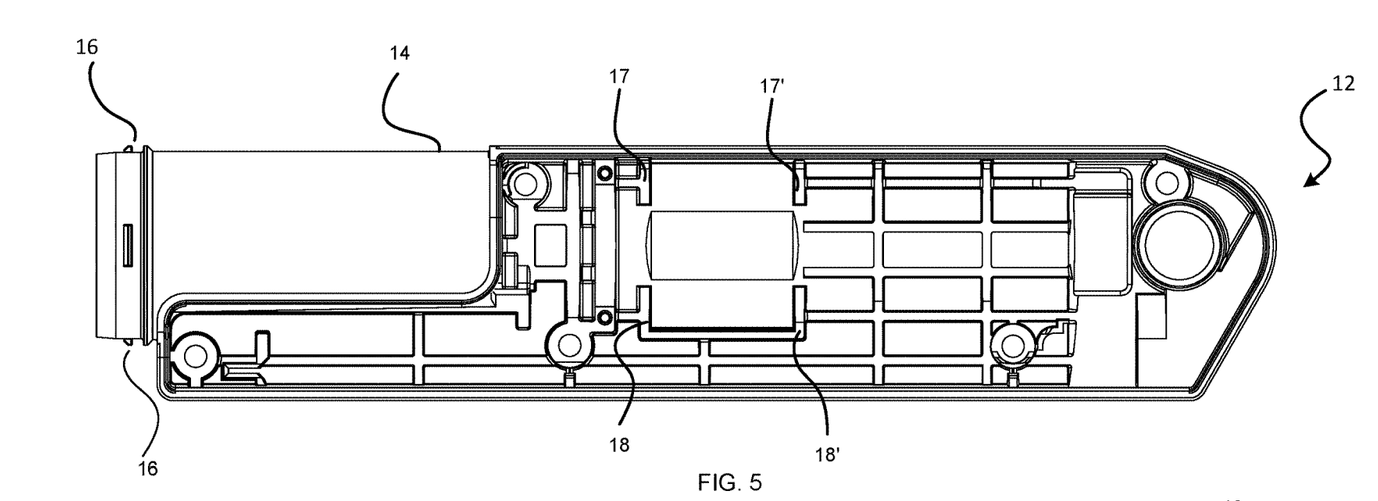
FIG. 5 shows a first side view of the housing.
Figure 6:
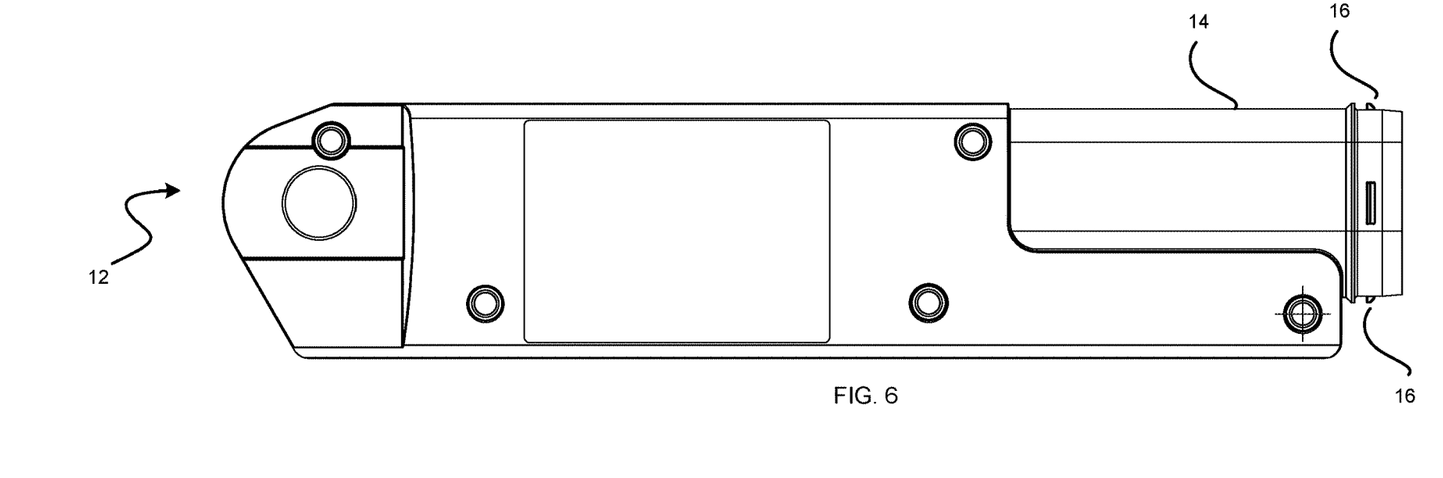
FIG. 6 shows a second side view of the housing.

FIG. 5 shows the second housing part 12 of the housing 10. The second housing part 12 has a first support member 17 and a second support member 18 positioned on the inner wall of the second housing part 12.

The first housing part 11 has a first support member 17' and a second support member 18' positioned on the inner wall of the first housing part 11. The housing 10 further comprises a tubular section 14 for supporting the outer tube.

The first support member 17, 17' and the second support member 18, 18' are arranged for fixation of the suspension element relative to the housing.

In FIG. 2, the planetary gear set comprises a sun gear 45 arranged in the centre of the transmission housing 41, five planet gears 44 that rotate around the sun gear 45, a planet carrier 46 that connects the planet gears 44, and a ring gear 43 (shown in FIG. 7) on the outside that meshes with the planet gears. The ring gear 43 is provided on the inner surface of the transmission housing 41. The planet gears 44 are rotatably mounted on the first end of the planet carrier 46 facing the interior of the transmission housing 41.

In FIG. 2, a bearing 54 is arranged around the spindle end 84 of the spindle 80 and the bearing 54 has an inner and an outer bearing ring also referred to as races and the rolling elements are placed in between the inner bearing ring and the outer bearing ring. The bearing 54 is used for transferring load exerted to the spindle and the inner tube to the rear mounting 6 of the actuator for preventing and avoiding tension load in the coupling and the transmission of the linear actuator.

Figure 7:
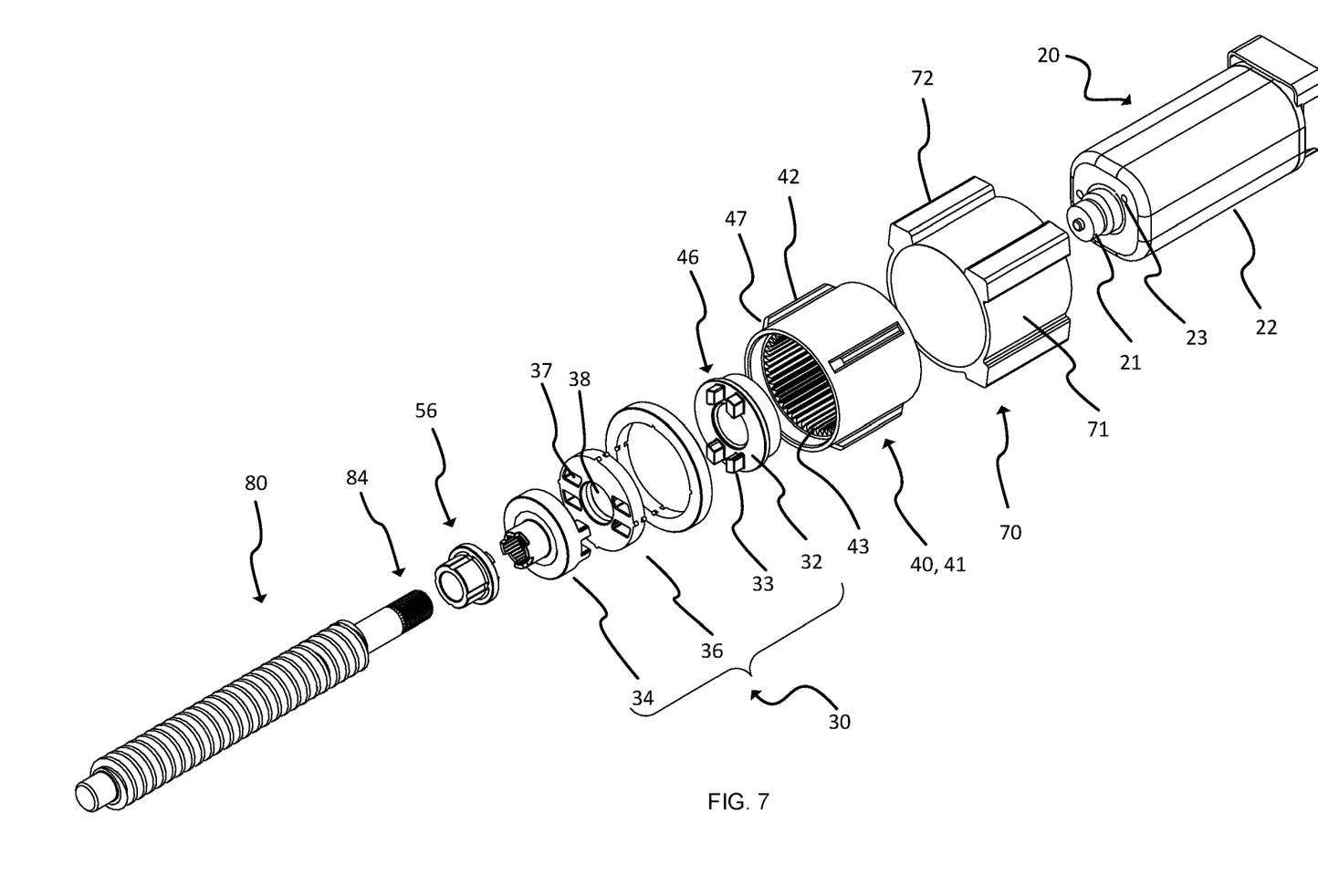
FIG. 7 is an exploded view showing the drive line of the linear actuator according to a preferred embodiment of the present invention.
Figure 8A:
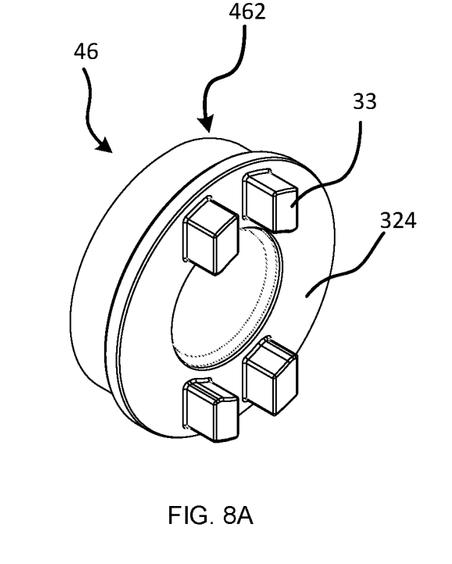
FIG. 8A-D show a perspective view of the first coupling part and the planet carrier.
Figure 8B:
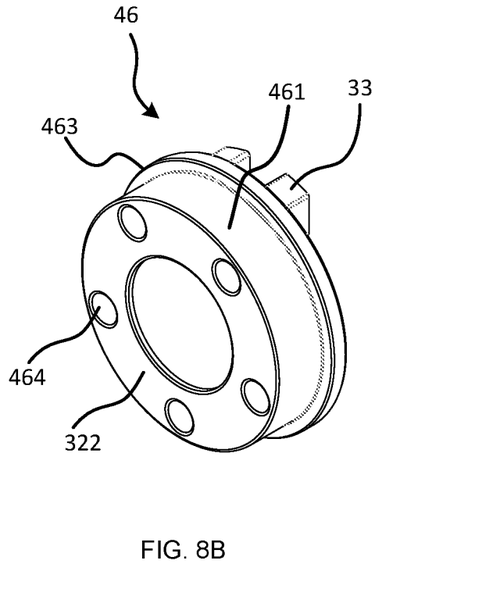
Figure 8C:
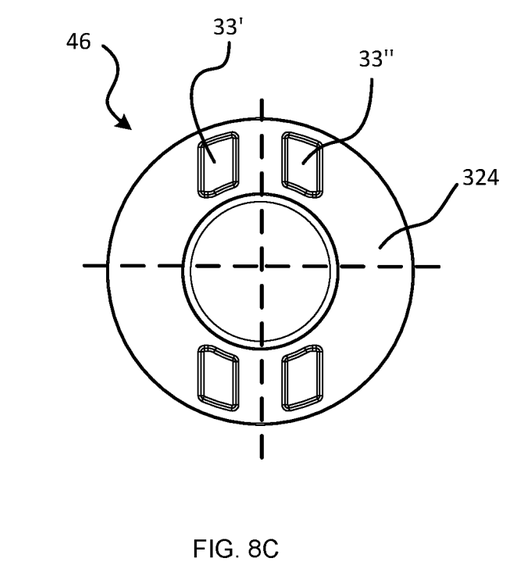
Figure 8D:
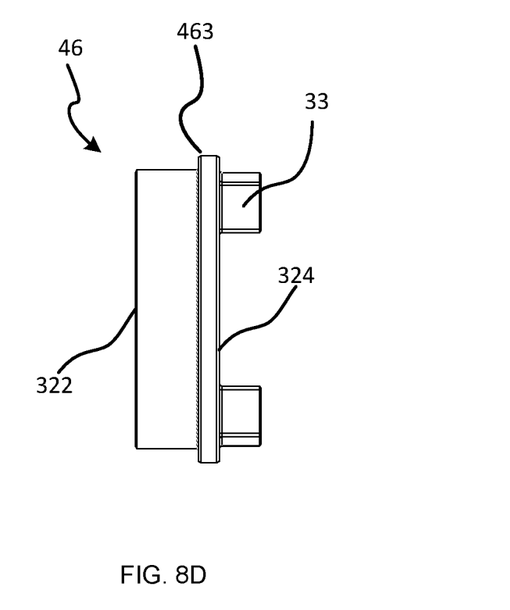
Figure 9A:
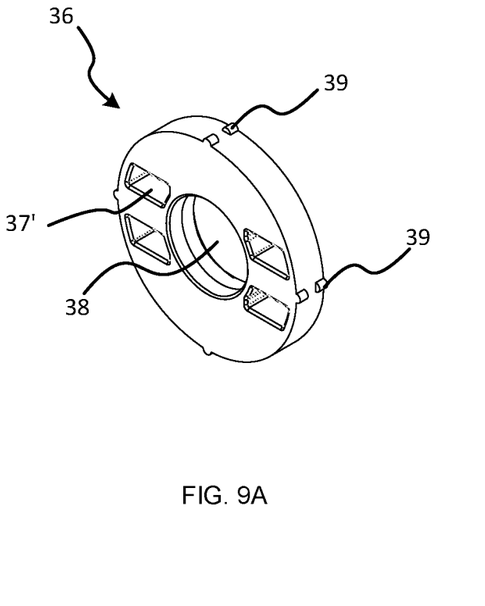
FIG. 9A-D show the coupling member according to a preferred embodiment of the present invention.
Figure 9B:
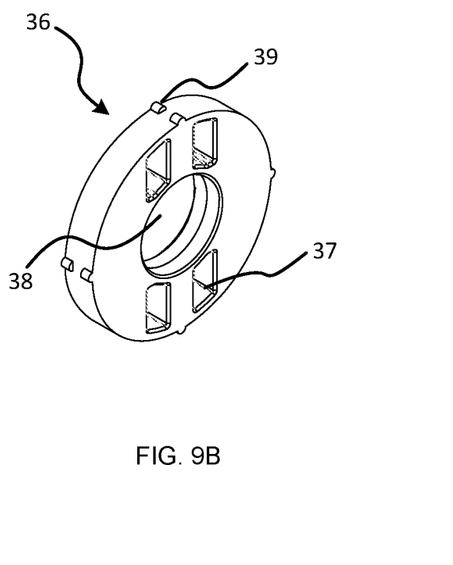
Figure 9C:
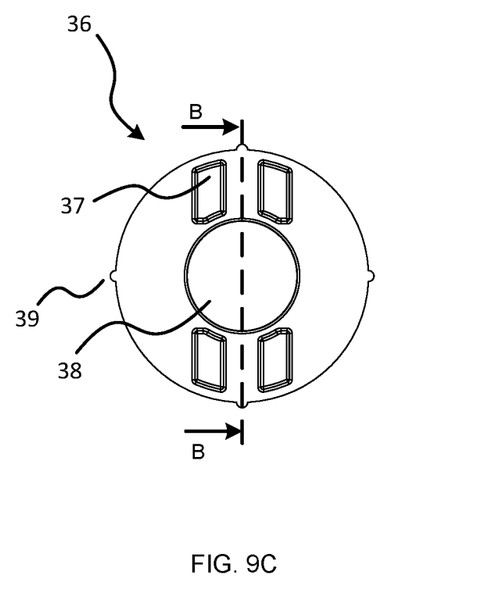
Figure 9D:
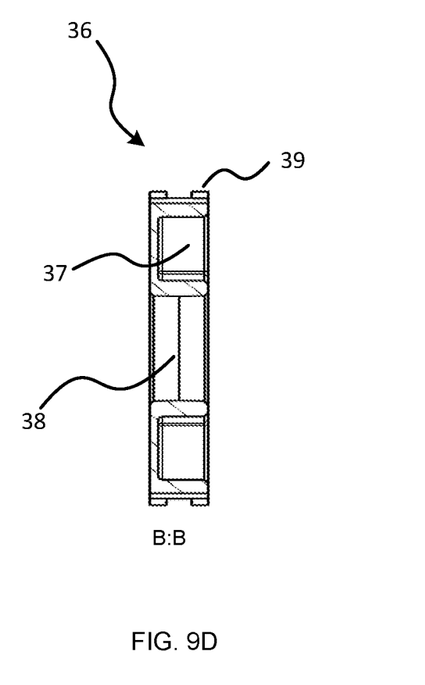

FIGS. 2 and FIG. 7 show the drive train of the present invention, where the drive train comprises an electric motor 20 having an output shaft 21 being connected to the transmission input end of the transmission 40. The transmission 40 includes a transmission housing 41, a transmission input end and a transmission output end positioned opposite the transmission input end. The transmission input end is constituted by a sun gear 45 and the output end is constituted by a planet carrier 46.

The electric motor 20 comprises a motor housing 22 having two motor mounting holes 23 arranged on the first end surface of the motor housing 22. The transmission housing 41 has two corresponding mounting holes located at a first end of said transmission housing 41. The mounting holes 23 in the electric motor are aligned with the corresponding mounting holes in the transmission housing and the first end of the transmission housing faces the first end surface of the motor housing 22 as the electric motor is connected to the transmission housing by means of two connecting screws (not shown).

As the electric motor 20 is connected directly to the transmission housing 41, the motor will be carried by the transmission 40. The suspension element 70 is arranged between the transmission housing 41 and the housing 10 of the linear actuator.

The housing 10 has an inner wall and the suspension element 70 is provided along the peripheral outer surface of the transmission housing 41 suspending the transmission 40 relative to the inner wall of the housing 10.

The transmission housing 41 has engaging elements 42 arranged on the outer surface of the transmission housing 41 for transferring the torque to the suspension element 70.

The engaging elements 42 protrude in the radial direction of the transmission housing 41 and extend along the longitudinal direction of the transmission housing. Each engaging element 42 has a tapered first end 47 and a tapered second end positioned opposite the first end 47.

The planet carrier 46 has a second end opposite the first end, and the second end has a number of coupling elements 33 protruding perpendicularly from the surface of the second end. The second end of the planet carrier 46 constitutes the first coupling part 32, and the first coupling part 32 is formed as an integral part of the planet carrier 46.

The coupling 30 comprises a first coupling part 32, a coupling member 36 and a second coupling part 34. The second coupling part 34 engages the spindle end 84.

Each of the two coupling parts 32, 34 is provided with a number of protruding coupling element 33 for engaging the coupling member. The coupling member is provided in the axial direction relative to the drive train.

The coupling member 36 is formed as a disc having a set of recesses 37 arranged on the first and the second side of the disc. Each side of the coupling member 36 has four recesses 37, and the recesses are spaced at a distance from the centre axis of the coupling member. The coupling member is provided with a hole in the centre for partially accommodating part of the end of the spindle 80.

When the drive train of the linear actuator is assembled, the electric motor 20 is coaxially connected to the transmission input end of the transmission and the protruding coupling elements 33 arranged on the first coupling part 32 and the second coupling part 34 will engage the recesses 37 in the coupling member 36 and part of the splined spindle end 84 of the spindle 80 will extend into centre hole of the coupling member 36.

FIG. 7 shows drive train of the linear actuator and the electric motor is shown without the electrical components such as the stator, the rotor, brushes etc. The electric motor housing 22 does not come into contact with the inner wall of the housing during operation, and the heat generated by the motor during operation of the linear actuator is transferred to the air surrounding the motor housing 22.

The suspension element is made from an elastomeric material such as nylon or polyurethane. The suspension element 70 has four peripheral suspension walls 71 arranged between two protruding members 72, and the first peripheral wall 71 has a wall thickness $t_1$. One of the peripheral walls has a wall thickness $t_2$ deviating from the first thickness $t_1$.

The protruding members 72 is used for suspending the transmission housing 41. Each protruding member 72 extends in the radial direction and each protruding member has a geometry complementary to the geometry of the inner wall of the first housing part 11 and the second housing part 12.

By using a suspension element 70 having four protruding members 72, it is possible to achieve a better retaining of the transmission and the suspension element relative to the housing part. The protruding members enable that the transmission is suspended along a number of contact surfaces relative to the housing 10, which provide spacing around the transmission. The protruding elements would preferably be spaced equal distantly from one another.

The transmission of the linear actuator includes an electric motor having an output shaft 21 being connected directly to the sun gear 45 positioned inside the transmission housing 41.

In FIGS. 8A-8D, the planet carrier 46 has a second end 324 opposite the first end 322 and the second end 324 has a number of coupling elements 33 protruding perpendicularly from the surface of the second end 324. The second end of the planet carrier 46 constitutes the first coupling part 32 and the first coupling part 32 is formed as an integrated part of the planet carrier 46. A pinhole 464 is provided on the surface of the first end 322 and the pinhole is used for insertion of a pin. Each planet gear is rotatably arranged on the pin.

The second coupling part 34 is provided with a number of protruding coupling elements 33 for engaging the coupling member 36. The coupling elements 33 are provided in the axial direction parallel to the longitudinal axis of the linear actuator.

The planet carrier 46 has a collar 463 facing the transmission housing 41 and a base part 461, which is equipped with an outer surface for forming a journal bearing surface 462. The outer diameter of the base part 461 of the planet carrier being slightly smaller the inner diameter of the transmission housing 41. However, it is possible to use a bushing 465, which is inserted into the transmission housing to provide a bearing surface for rotary applications. The journal bearing surface of the base part 461 and the bushing constitute a common form of a journal bearing.

In FIGS. 9A-9D, the coupling member 36 is used for transmitting torque and has a rigid and wear-resistant surface in the sliding connection area 37,37'. The coupling member 36 is formed as a disc and each side of the coupling member 36 has four recesses 37 and the recesses are spaced at a distance from the centre axis of the coupling member. The first set of recesses 37' is arranged on the first side of the coupling member 36 and the second set of recesses 37" is arranged on the second side of the coupling member 36. The second set of recesses 37' being arranged orthogonal to the first set of recesses 37'.

A hole 38 is provided in the centre of coupling member 36 and the hole 38 has a diameter which is substantially larger than the outer diameter of the spindle end 84 for partially accommodating part of the end of the spindle 80.

The recesses 37 do not extend the whole thickness of the coupling member 36 and the coupling member 36 can therefore be used to provide a thermal and an electrical insolation between the electrical motor and the spindle for preventing heat and current from being transferred to the outer tube and inner tube of the linear actuator.

In FIGS. 10A-10D, the second coupling part 34 has an internal splined portion 341 for engaging the spindle end 84. The spindle end 84 has a splined outer surface. The second coupling part 34 is provided with four protruding coupling elements 35,35',35" for engaging the coupling member 36.

The coupling elements 35,35',35" are protruding perpendicularly from the first surface 342 of said second coupling part 34 and being provided in the axial direction parallel to the longitudinal axis of the linear actuator.

The second coupling part 34 has an elongated element 343 protruding perpendicularly from a second surface 345 of said second coupling part 34, where the second surface 345 is located on the opposite side of the first surface 342 of said second coupling part 34. The first surface 342 of said second coupling part 34 is facing the transmission housing 41 and the second surface 345 is forming a contact surface with the bearing 54 shown in FIG. 2. The inner bearing ring of the bearing 54 is arranged on the elongated element 343 and the axial retainer 56, which also prevents the bearing from being displaced in the axial direction of the linear actuator.

Figure 10A:
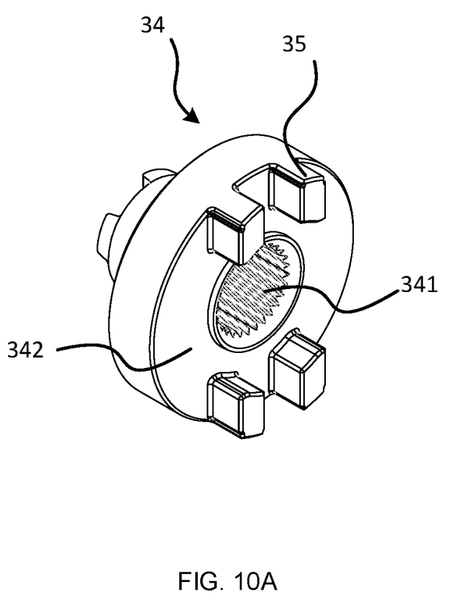
FIG. 10A-D show the second coupling part according to a preferred embodiment of the present invention.
Figure 10B:
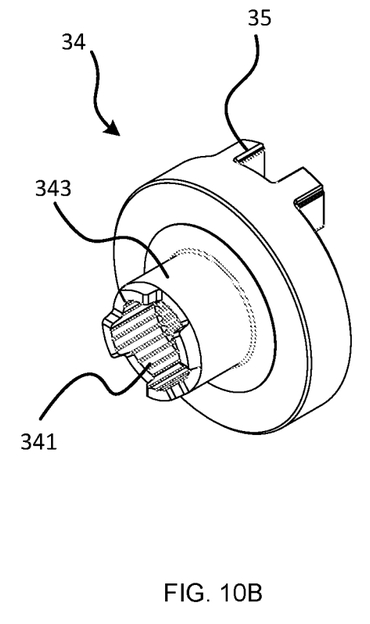
Figure 10C:
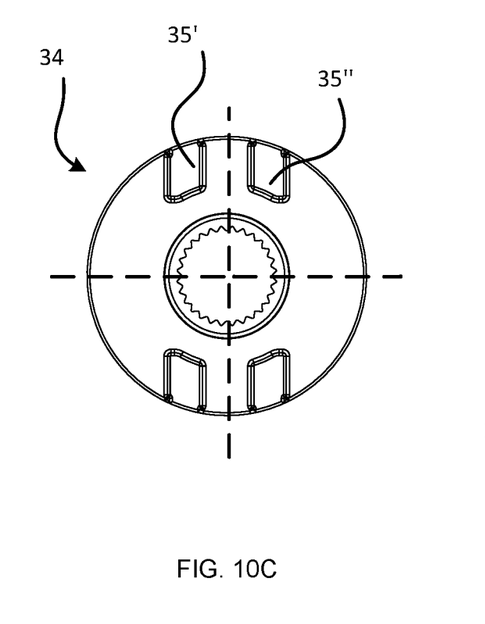
Figure 10D:
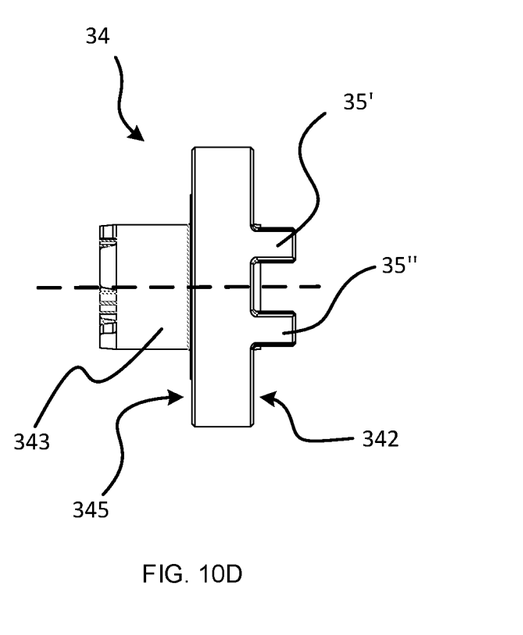

In FIG. 10C, two centrelines are depicted, one being positioned vertically and the other in the horizontal, each coupling elements 3, 35',35" is offset relative to the two centrelines and each coupling element 35',35" is positioned along the circumference of the second coupling part 34.

By arranging each of the four protruding coupling elements 35, 35',35" along the circumference of the second coupling part, this enables that the material is placed at the region where torque and shear distribution is of the highest magnitude.

REFERENCE NUMBERS

In the following is given a list of reference numbers that are used in the detailed description of the invention.

linear actuator 1
inner tube 2
outer tube 3
socket 4
front mounting 5
rear mounting 6
housing 10
first housing part 11
second housing part 12
inclined inner surface 13
tubular section 14
tip of housing 15'
first end 15
connecting elements 16
first support member 17, 17'
second support member 18, 18'
electric motor 20
output shaft 21
motor housing 22
motor mounting hole 23
coupling 30
first coupling part 32
first end of the first coupling part 322
second end of the first coupling part 324
protruding coupling element 33, 33', 33"
second coupling part 34
internal portion 341
first surface of the second coupling part 342
elongated element 343
second surface of said second coupling part 345
protruding coupling element 35, 35', 35"
coupling member 36
recess 37, 37', 37"
centre hole of coupling member 38
transmission 40
transmission housing 41
engaging element 42
ring gear 43
planet gear 44
sun gear 45
planet carrier 46
base part of planet carrier 461
journal bearing surface 462
collar 463
pinhole 464
bushing 465
sealing element 50
bearing 54
inner bearing ring 542
axial retainer 56
tapered end 47
retaining element 60
suspension element 70
peripheral suspension wall 71
suspension element 72
spindle 80
spindle nut 81
threaded spindle portion 82
external threads 83
spindle end 84

The invention claimed is:

1. A linear actuator (1) comprising an electric motor (20), a transmission (40), a spindle (80), a spindle nut (81), a housing (10), an outer tube (3) and an inner tube (2);
the outer tube (3) being connected to the housing (10);
the spindle (80) being interconnected to the transmission (40) via a coupling;
the spindle nut (81) being arranged on the spindle (80);
the inner tube (2) being connected to the spindle nut (81);
the spindle nut (81) and the inner tube (2) being guided inside the outer tube (3), wherein
the transmission (40) including a transmission housing (41), a transmission input end and a transmission output end positioned opposite the transmission input end, wherein the transmission comprises a planetary gear set having a sun gear (45) arranged in the centre of the transmission housing (41), a planet carrier (46) and a number of planet gears (44) rotatably mounted on the planet carrier and surrounding the sun gear (45);
the electric motor (20) having an output shaft (21) being coaxially connected to the transmission input end of the transmission;
wherein the coupling (30) comprises:
a first coupling part (32) being connected to and rotatable with the output end of the transmission;
a second coupling part (34) being connected to and rotatable with the end of the spindle;
and a coupling member (36) disposed between the first and second coupling parts (32,34) and slidably engaged with the first and second coupling parts (32,34), wherein the coupling member (36) is configured to transmit rotational force from the first coupling (32) part to the second coupling part (34); wherein the planet carrier (46) has a first end facing the transmission housing and a second end (32) opposite the first end, the second end (32) having a number of coupling elements (33) protruding perpendicularly from the surface of the second end and the second end (32) of the planet carrier (46) constituting the first coupling part forming an integrated part of the planet carrier (46).

2. The linear actuator according to claim 1 wherein the input end of the transmission being constituted by a sun gear (45) and the output end of the transmission being constituted by a planet carrier (46).

3. The linear actuator of claim 1 wherein the second coupling part (34) is provided with four protruding coupling elements (35,35', 35") for engaging the coupling member (36) and the coupling elements (35, 35', 35") are protruding perpendicularly from the first surface (342) of said second coupling part (34).

4. The linear actuator of claim 1 wherein the coupling member (36) is an intermediated element disposed between the first and the second coupling parts (32,34) having a set of recesses (37) arranged on each side of the coupling member (36).

5. The linear actuator of claim 1 wherein the coupling member (36) is provided with a hole (38) in the centre for partially accommodating part of the end of the spindle (80).

6. The linear actuator of claim 1 wherein the second coupling part (34) has an internal portion (341) for engaging the spindle end (84).

7. The linear actuator of claim 1 wherein the planet carrier (46) has a collar (463) facing the transmission housing and an outer surface forming a journal bearing surface (462).

8. The linear actuator of claim 1 wherein the second coupling part (34) has an elongated element (343) protruding perpendicular from a second surface (345) of said second coupling part (34).

* * * * *